United States Patent [19]

Kodama et al.

[11] Patent Number: 5,532,563

[45] Date of Patent: Jul. 2, 1996

[54] DISK DEVICE WITH AUXILIARY BATTERY AND START METHOD THEREOF

[75] Inventors: Kouji Kodama, Odawara; Hiroshi Nishida, Naka-gun; Hideaki Amano, Odawara; Toshio Matsushita, Ashigarakami-gun, all of Japan

[73] Assignee: Hitachi, Ltd., Tokyo, Japan

[21] Appl. No.: 258,234

[22] Filed: Jun. 10, 1994

[30] Foreign Application Priority Data

Jun. 10, 1993 [JP] Japan ................................ 5-138672

[51] Int. Cl.$^6$ .................................................. H02P 1/00
[52] U.S. Cl. ...................... 318/440; 360/73.03; 318/272
[58] Field of Search ................................. 318/139, 138, 318/254, 439, 440, 442, 778, 781, 105, 108, 268, 272; 290/38 R; 360/69, 73.03, 74.1, 73.05, 74.4; 307/64–66, 75; 369/44.27, 44.29, 44.35, 243, 266, 267

[56] References Cited

U.S. PATENT DOCUMENTS

| | | | |
|---|---|---|---|
| Re. 34,399 | 10/1993 | Gami et al. | 360/73.01 |
| 3,787,724 | 1/1974 | Pedersen et al. | 318/778 |
| 3,997,832 | 12/1976 | Tanaka et al. | 318/139 X |
| 4,156,171 | 5/1979 | Kofink | 320/17 |
| 4,412,137 | 10/1983 | Hansen et al. | 307/71 |
| 4,933,785 | 6/1990 | Morehouse et al. | |
| 5,068,582 | 11/1991 | Scott | 318/254 |
| 5,157,267 | 10/1992 | Shirata et al. | 290/38 R |
| 5,208,518 | 5/1993 | Grapenthin et al. | 318/138 |
| 5,258,695 | 11/1993 | Utenick et al. | 318/138 |
| 5,332,954 | 7/1994 | Lankin | 318/139 |

FOREIGN PATENT DOCUMENTS

| | | |
|---|---|---|
| 60-212870 | 10/1985 | Japan . |
| 4-205963 | 7/1990 | Japan . |
| 3-49062 | 3/1991 | Japan . |
| 3-134874 | 6/1991 | Japan . |

*Primary Examiner*—Jonathan Wysocki
*Attorney, Agent, or Firm*—Fay, Sharpe, Beall, Fagan, Minnich & McKee

[57] ABSTRACT

A disk device, such as an optical disk or magnetic disk, for a computer is mounted on the computer or inserted in a slot in the computer. The computer or host device provides a power supply for the disk device that is used to drive the disk in rotation and power the seek operation for read and write. When the disk device is in an idle mode in which the disk media is not spinning, the disk(s) must first be driven to the access speed of rotation during a spin up or start of rotation time period. The current supplied by the external main power source for the computer provides the start current for the spindle motor that drives the disk(s) in rotation. An auxiliary power source provides an additional current that is added to the current provided by the main power source to decrease the time in which the start operation is executed or to ensure start up when only a limited amount of current is available from the main power source. The auxiliary power source is rechargeable from the main power source, and the additional current from the auxiliary power source is not provided unless the charge state of the auxiliary power source is determined to be sufficient.

16 Claims, 9 Drawing Sheets

DISK DEVICE WITH AUXILIARY BATTERY AND START METHOD THEREOF

FIELD OF THE INVENTION

The present invention relates to a disk device such as a magnetic disk device or an optical disk device and, in particular, to a disk device which is started for spin up to an access speed or operational speed from a motionless idle mode in which the device medium is motionless, with a small start current according to a predetermined method of starting the same.

BACKGROUND OF THE INVENTION

Miniaturization of computers has proceeded from desktop size computers through lap-top and note-book sizes and even to pocketbook sizes, recently. With such miniaturization, commercially available magnetic disk devices have been miniaturized from 3.5 inches, through 2.5 inches and 1.8 inches and even to 1.3 inches. This tendency is also true for optical disk devices. In the following description, the term "disk device" incudes both magnetic disk devices and optical disk devices.

With the miniaturization of the disk device and devices to be mounted thereon, it has been desired to reduce the power consumption thereof. An example of such prior art techniques for reducing the power consumption of a magnetic disk device is disclosed in U.S. Pat. No. 4,933,785 (corresponding to Japanese Patent Application Publication No. 3-503101). In this technique, the operation mode is divided into a sleep mode in which circuit functions other than a minimum interface function for an up-link connection necessary for restart of the CPU are stopped; an idle mode in which the CPU is operative and other functions of the spindle motor circuit, a servo circuit and a recording and reproducing circuit, etc., other than the up-link connection function are stopped; and another idle mode in which the servo function for a rotating spindle motor is operative and the data recording and reproducing circuit as well as the usual write and read seek mode are inoperative. Accordingly, there are specific power supply requirements for the respective modes, and the power supplied to circuit portions which are not needed to function in a specific mode is reduced. In this method, however, there is no provision made for the reduction of the power source current required to be provided for the start time of a disk device including during the initial portion of a start period of a spindle motor from a state wherein the disk is not spinning.

In another example, there is a method disclosed in Japanese Patent Application laid-open No. H4-205963, wherein power consumption during re-start of a spindle motor is reduced by reducing the rotation speed of the spindle to an extent that its rotation can be maintained in an idle mode in which write and read is not performed. Although this method is effective to reduce power consumption without increasing the required time for re-start, there is still no provision made for sufficiently reducing the power source current required during the start time of the disk device spin up during the initial portion of the start period for spin up of a spindle motor powered disk device from a motionless state of the disk.

On the other hand, in consideration of providing an alternative approach to meeting the low power and high speed start up requirements for miniaturized devices, initial start software, such as an OS (operating system) of a computer, has been expanded and diversified as can be seen in, for example, UNIX, so that a memory device can be provided that has large memory capacity, which is required for storing such software information. Although semiconductor memory devices are suitable for large capacity storage and short initial start times, a magnetic disk device is still preferred since there is a high cost per memory capacity of such semiconductor memories, compared with that of magnetic disk devices.

SUMMARY OF THE INVENTION

In general, with miniaturization of computer devices, the power source has a relatively small current supply capacity and is designed for minimum space requirements while economically providing the required power. Therefore, in a compact disk device that is mounted on or used with such a compact computer device, the start time and seek and access time are to be short and the maximum required power source current capacity is to be small. On the other hand, however, a high speed spindle motor is required in order to shorten the spin up rotation wait time, which is a source or an increase in the motor start current. Maximum current consumption of such compact disk devices occurs during a start time of the disk device including an initial start period of the spindle motor when spin up occurs from a motionless idle mode in which the device medium is not spinning or when a seek operation occurs. In general, the start time is very long compared with that of the seek time. Since, therefore, shortening of the start time is more important than shortening the seek and access time, the maximum current required for the starting of the disk device becomes the required power source current capacity of the disk device although the start operation is a temporary and transient operation compared with that of the write/read and seek operation, which is the main and usual operation of the disk device. Therefore, when the required maximum start current (maximum disk drive current) is increased to shorten the start time, the required power source current capacity must be increased, resulting in the necessity of a large power source device.

An object of the present invention is, therefore, to provide a disk device and a method of start up for the disk device that solves the above mentioned problems of the conventional techniques, that can shorten the start time for the disk device without increasing the required power source current capacity of the computer power supply and that can alternatively reduce the required power source current capacity of the computer power supply without increase of start time.

Another object of the present invention is to provide a disk device and a start method therefor that provides high performance, that has a short initial start time, and that is relatively inexpensive.

A further object of the present invention is to provide a disk device and a start method therefor by which an upper (host) device, etc., connected thereto selects the minimum start time for bringing the disk device up to speed in consideration of the available current from the power source.

In order to achieve the above objects according to the present invention, the disk device connects to an external power source and has a spindle motor drive circuit, and an auxiliary power source that is rechargeable from the external power source. Also, recharging means for the auxiliary power source and further current adding means are provided for adding a current from the external power source to a current from the auxiliary power source during a predetermined period. The period in which the current is added includes at least an initial period of start up of rotation of the spindle motor during which the spindle motor start current becomes maximum. Also included are means for supplying the added current to the spindle motor drive circuit during the predetermined period.

In particular, the disk device includes a charge state detector for detecting the charge state of a rechargeable auxiliary power source or recharging information holding means for holding information concerning the state of the recharging, a plurality of start control procedures including spindle motor start procedures having different required maximum start up currents for starting spin up of the disk device and means for selecting and executing one of the start control procedures. According to the invention, a relatively small start current is used, when the amount of charge of the auxiliary power source is judged to be smaller than a predetermined amount on the basis of the detection result of the charge state detector or the stored recharging information; and a relatively large start current is used when the amount of charge of the auxiliary power source is judged to be equal to or in excess of the predetermined amount.

In one embodiment of the invention, a portion or all of the auxiliary power source is provided externally of the disk device and electrical connection means are provided for electrically connecting the external auxiliary power source to the current adding means and the recharging means in the disk device.

The required current capacity of the external power source during the start time of the device is set to be equal to or not larger than the required current capacity of the external power source during a seek time.

In another embodiment of the invention, the whole of the auxiliary power source, the recharging means (circuit) and the charge state detector or the recharging information holding means are provided externally of the disk device and means is included for electrically connecting the external auxiliary power source to the current adding means within the disk device.

The device of the invention also includes an indicator for indicating that the auxiliary power source is to be replaced by a new auxiliary power source on the basis of the charging/discharging life of the auxiliary power source. Alternatively, an indicator or detector can be provided to report the charging/discharging life of the auxiliary power source to a host device or other monitoring device.

The housing or configuration of the auxiliary power source is a rectangular-parallelepiped casing, wherein two of the three outer dimensions of the casing have larger values than that of the remaining outer dimension and wherein these dimensions are substantially the same as those of two of the three outer dimensions of the disk device casing which also have larger values than that of the remaining dimension. The casing of the disk device and the casing of the auxiliary power source are therefore preferably assembled together to form a PCMCIA card sized device, according to one of the standard sizes. Accordingly, the casings are connected so that the areas defined by the two (larger) outer dimensions, respectively, are juxtaposed to provide a substantially rectangular-parallelepiped shape outer face. Since an external rectangular-parallelepiped configuration of the assembled casings of the auxiliary power source and the disk device is the same as the so-called form factor size (standard size) of the incorporated casing of the disk device, that is, the same as the standard size such as 3.5 inches, 2.5 inches, 1.8 inches, the handling is convenient.

Further, according to the invention, a plurality of the disk devices can be provided to commonly use a single rechargeable auxiliary power source means provided externally of the device. Such a plurality of disk devices may be configured in a well known disk array.

It is another object of the invention that the disk device stores procedures or data necessary for an initial start up of a computer device to which it is connected.

In accordance with another aspect of the invention, one of a plurality of spindle motor start control procedures is selected including at least a first spindle motor start control procedure and a second spindle motor start control procedure, wherein a required start power source current of the disk device during an execution of the first spindle motor start control procedure is set larger than that during the seek operation, and wherein a required start power source current of the disk device during an execution of the second spindle motor start control procedure is set substantially equal to or smaller than that of the seek operation. Additionally, the required time for the spin up of the spindle motor according to the first spindle motor start control procedure is set shorter than that of the second spindle motor start control procedure.

The invention is also directed to the operation of the disk device in that, according to the present invention, a current supplied from the external power source is added to the current supplied from the auxiliary power source, which is recharged for a long time with a relatively small current, during a transient period including an initial period of the start of the spindle motor. Specifically, the spindle motor start current that is provided to the spindle motor becomes maximum when the added current is supplied to the current from the external power source. Therefore, during the start time of the spindle motor which requires a large start current, a shortage in the supply current from the main external power source can be supplemented by the rechargeable auxiliary power source and thus it is possible to shorten the start time (spin up time) by using an external power source having a relatively small capacity. Preferably, also, any reverse current from the auxiliary power source that might tend to flow to the external power source is prevented by a reverse current blocking device.

DESCRIPTION OF THE PREFERRED EMBODIMENTS

Figure 1:
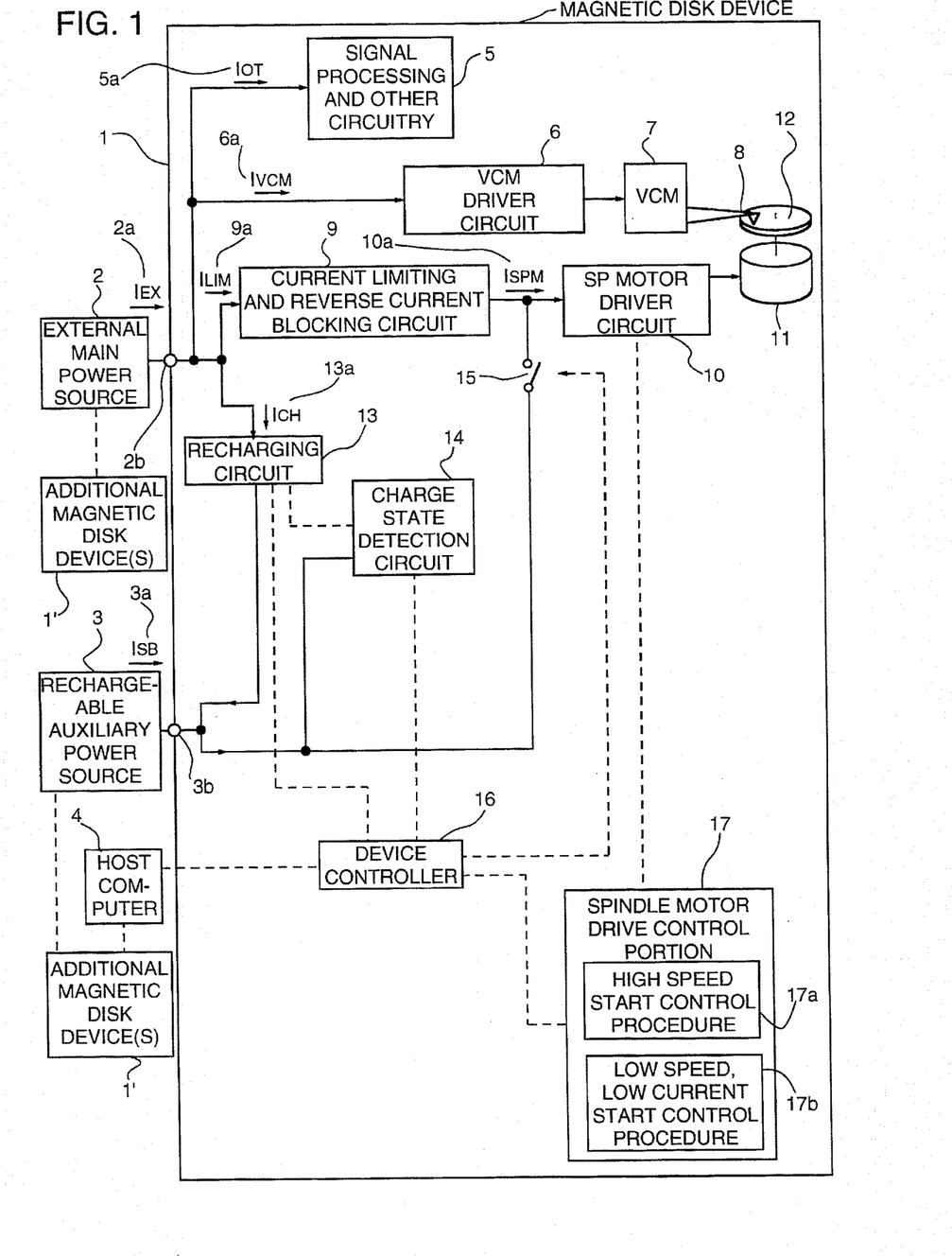
FIG. 1 shows a block diagram construction of a magnetic disk device according to a first embodiment of the present invention.

FIG. 1 shows a construction of a magnetic disk device according to a first embodiment of the present invention. A magnetic disk device 1, such as a hard disk, is connected to an external power source 2, a rechargeable auxiliary power source 3 and an upper (host) device 4. The external power source is a usual commercial power source, such as a battery, etc., which is also used by the host device and is essentially the main or only power source in use except for the auxiliary power source 3.

An external main power source current ($I_{EX}$) 2a supplied from the external power source 2 through an input connector 2b. Internally, current ($I_{EX}$) 2a is branched to an input current ($I_{OT}$) 5a for a signal processing system and other circuits, an input current ($I_{VCM}$) 6a and an input current $I_{LIM}$ 9a. Input current 6a drives a voice coil motor drive system which includes a voice coil motor 7 and a head 8 ganged therewith that is controlled by a voice coil motor drive system circuit 6. Input current ($I_{LIM}$) 9a, which passes through current limiting and reverse current blocking circuit 9, is supplied to a driver circuit 10 for controlling the spindle motor 11 and a disk 12. Circuit 9 controls an upper limit of the current and the reverse current blocking is achieved through a reverse current blocking diode, for example.

Since the auxiliary power source is rechargeable, an input current ($I_{CH}$) 13a is supplied to a recharging circuit 13 for recharging the power source 3. A charge state detection circuit 14 detects a charge state of the rechargeable auxiliary power source 3 on the basis of an output voltage thereof or a stored operational history (number of charging cycles, for example) of the recharging circuit 13 and reports it to a controller 16.

An output current ($I_{SB}$) 3a is supplied from the rechargeable auxiliary power source 3 through the connector 3b to the magnetic disk device 1 and is added to the current $I_{SPM}$ through a current adder switch 15 for supplying the spindle motor drive circuit 10. The host device (CPU) 4 is connected to a device controller 16 of the magnetic disk device 1 to exchange data and control information. The device controller 16 responds to the charge state of the auxiliary power source 3 to select an appropriate start control procedure. A spindle motor drive control portion 17 responds to an instruction from the device controller 16 to control the start of rotation from a motionless idle mode in which the disk is not spinning and normal rotation of the spindle motor 11 and the disk 12 through the spindle motor drive circuit 10 according to either a high speed start control procedure 17a or a low speed, low current start control procedure 17b. A required rotation start current and a required start time for the low speed, low current start control procedure 17b are set to be about ½ and about twice those for the high speed start control procedure 17a, respectively. A current limiting value in the current limiting/reverse current blocking circuit 9 is set to a value which is substantially equal to but not smaller than the maximum required current for the low speed, small current start control procedure 17b. A power source current of the spindle motor drive control portion 17 is a portion of the current ($I_{OT}$) 5a.

Figure 2:
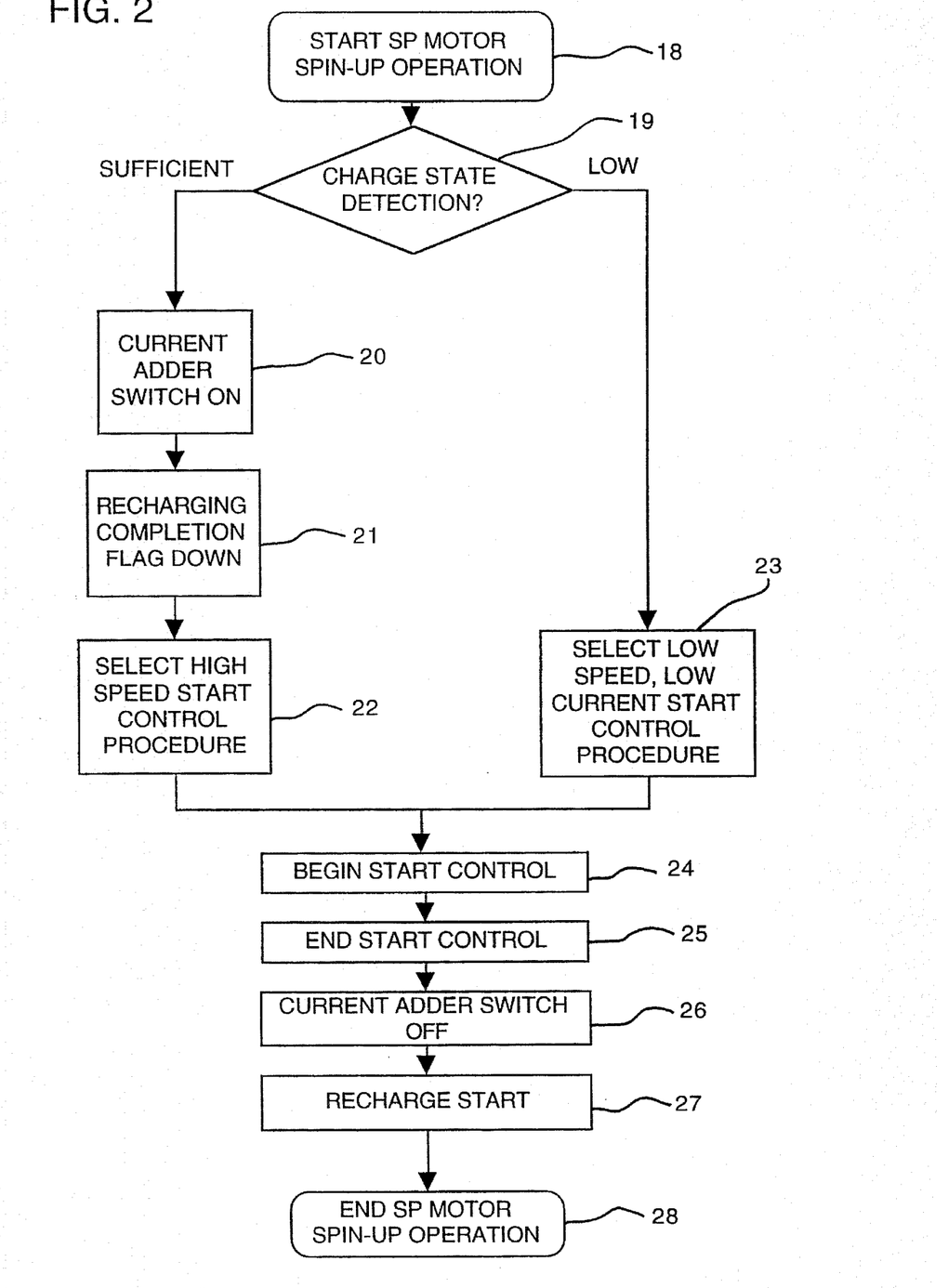
FIG. 2 is a flow chart showing the operation of a spindle motor according to the first embodiment of the invention.

FIG. 2 is a flowchart showing a start operation of the spindle motor in the disk device.(embodiment 1) shown in FIG. 1. The magnetic disk device 1 is triggered by a start of the power supply from the external main power source or a start instruction from the host device 4 according to a predetermined start mode for starting the operation of the spindle motor (step 18). Then, the charge state is detected (step 19).

In order to detect the charge state, a non-volatile memory is provided in the charge state detection circuit 14 (FIG. 1) in which a recharging completion flag is set, i.e. which becomes "1" when a recharging of the rechargeable auxiliary power source 3 is completed and is reset, i.e. becomes "0" when discharging of the auxiliary power source 3 is started. The status of the flag is stored in the memory device and can be accessed by the device controller 16. In step 19, the charge state is detected on the basis of this recharging completion flag and a terminal voltage of the auxiliary power source 3. When the auxiliary power source 3 is recharged enough, the current adder switch 15 is turned ON (step 20), the recharging completion flag in the non-volatile memory circuit is reset (step 21) and the high speed start control procedure 17a is selected (step 22). When the charge state detection flag is "1" (step 19) indicating that the auxiliary power source is not recharged enough, the current adder switch 15 is held in OFF state and the low speed, low current start control procedure 17b is selected (step 23). Then, according to the selected start control procedure, a start control of the spindle motor is executed (step 24). After the execution of the start control procedure terminates (step 25), the current adder switch 15 is turned OFF (step 26), recharging of the rechargeable auxiliary power source 3 is started (step 27) and the start operation of the spindle motor has been completed (step 28).

The recharging operation is stopped after a predetermined time lapses from the start of recharging or when an overcharge voltage is detected. Then, the recharging completion flag is set to "1", a recharge cycle counter (not shown) provided for the purpose of knowing the remainder of the life of the auxiliary power source (battery) by referencing the number of recharge cycles is updated (+1) and stored as recharge cycle data in a recharge history memory portion provided in the non-volatile memory, accessible on demand.

It is possible to provide, in the controller 16, means, such as a comparator, which judges the charge/discharge life of the auxiliary power source on the basis of this recharge cycle data and, when it is judged that a remaining life of the auxiliary power source is less than an acceptable minimum, displays or reports to the host device that the auxiliary power source is to be replaced by a new one.

FIGS. 3, 4, 5(a) to 5(c) are graphs showing variations of the external main power source current $I_{EX}$, the spindle motor drive circuit current $I_{SPM}$, the recharge circuit current $I_{CH}$, the voice coil drive circuit current $I_{VCM}$ and the signal system and other circuit current $I_{OT}$, respectively for the condition when the charge state of the auxiliary power source is deemed sufficient.

Figure 3:
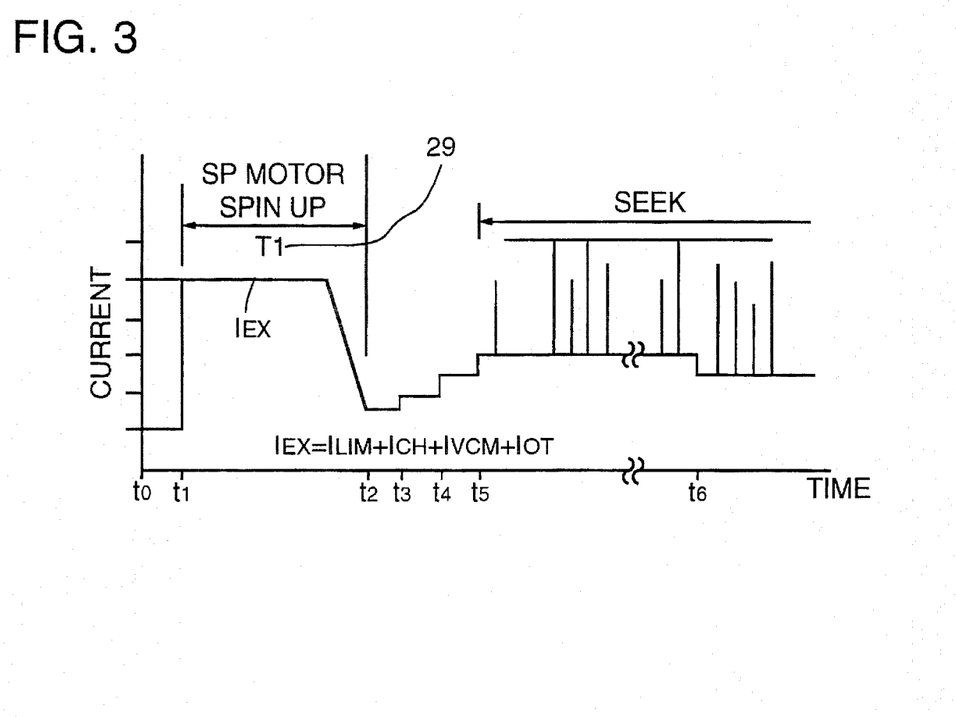
FIG. 3 is a graph showing the current of an external main power source when charging is sufficient, according to the first embodiment.

In these figures, t0 denotes a start time point at which the rotation of the spindle motor is started, t2 a time point at which the start of acceleration of the spindle motor rotation is ended, t3 a time point at which the current adding switch 15 is turned OFF, t4 a time point at which recharge is started, t6 a time point at which the recharge is ended and t5 a time point at which the drive of the voice coil motor is started. Further, $I_{LIM}$ is an input current to the recharge limiting and reverse current blocking circuit and $I_{SB}$ is an output current from the rechargeable auxiliary power source 3. The external main power source current ($I_{EX}$) 2a is represented as follows.

$$I_{EX} = I_{LIM} + I_{CH} + I_{VCM} + I_{OT}$$

Figure 4:
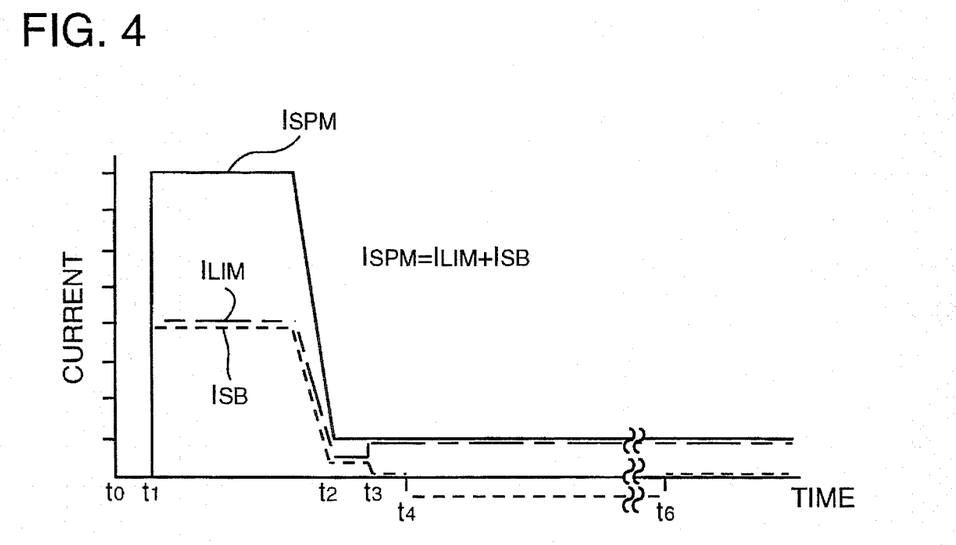
FIG. 4 is a graph showing the spindle motor drive current when charging is sufficient, according to the first embodiment.

Therefore, the current $I_{EX}$ in FIG. 3 has a wave form which is a combination of wave forms of the currents shown in FIGS. 4 and 5(a) to 5(c). The input current ($I_{SPM}$) 10a of the spindle motor drive circuit is represented as follows.

$$I_{SPM} = I_{LIM} + I_{SB}$$

Figure 5:
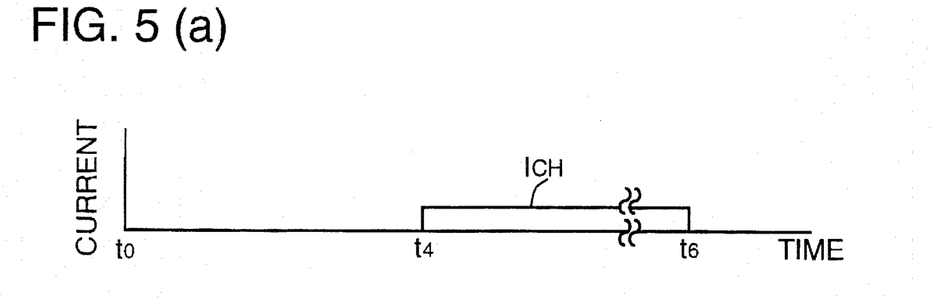
FIG. 5(a) shows a graph of the recharge circuit current when charging is sufficient, according to the first embodiment.
FIG. 5(b) shows a graph of a voice coil motor drive circuit when charging is sufficient, according to the first embodiment.
FIG. 5(c) shows a graph of the signal processing and other circuits when charging is sufficient, according to the first embodiment.

In FIG. 3 or 5(b), a period (in the order of several ms to 10 ms) in which pulsed current flows indicates a seek period and the magnitude of these pulses depends upon the seek distance. A current between respective pulse currents of the current $I_{VCM}$ (from t5) is a read/write period.

In the start period T1 of the spindle motor rotation, the external main power source ($I_{EX}$) 2a is only about a half of the input current ($I_{SPM}$) 10a of the spindle motor drive circuit and is set such that it is smaller than the maximum required current ($I_{EX}$) of the external main power source during the seek period. It is clear that this is the effect obtained by utilizing the output current ($I_{SB}$) 3a of the auxiliary power source.

Similarly, FIGS. 6, 7 and 8(a) to 8(c) are graphs showing variations of magnitudes of the currents $I_{EX}$, $I_{SPM}$, $I_{CH}$, $I_{VCM}$ and $I_{OT}$ when, in the first embodiment, the recharge of the auxiliary power source is insufficient.

Figure 6:
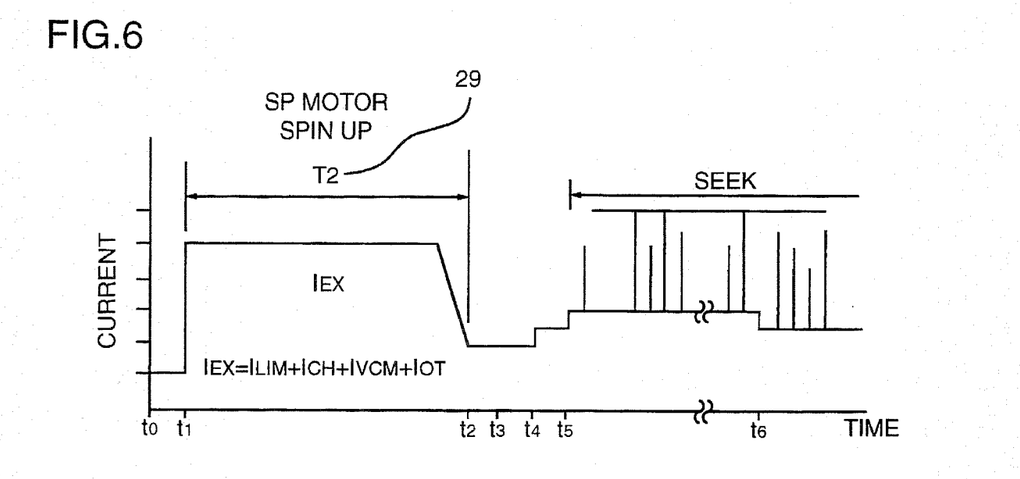
FIG. 6 is a graph showing the current of an external main power source when charging is insufficient, according to the first embodiment.
Figure 7:
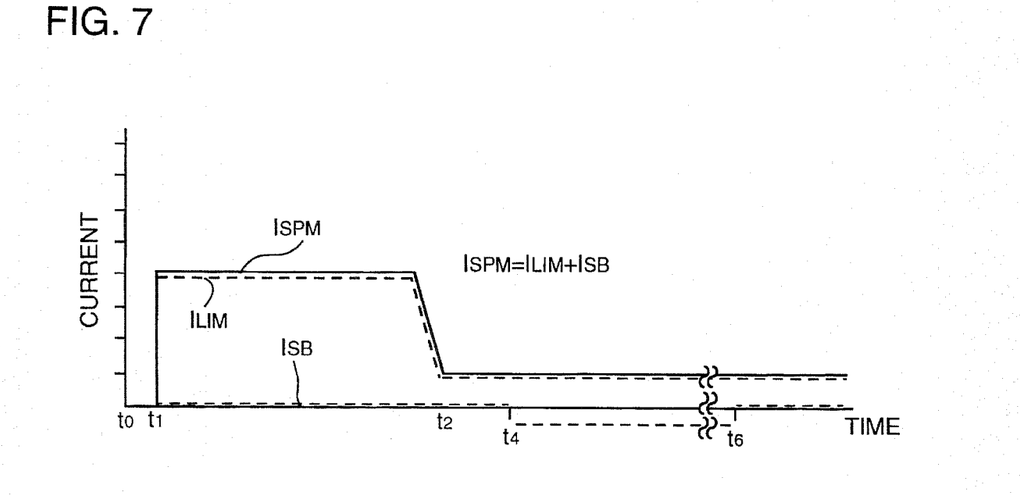
FIG. 7 is a graph showing the spindle motor drive current when charging is insufficient, according to the first embodiment.
Figure 8:
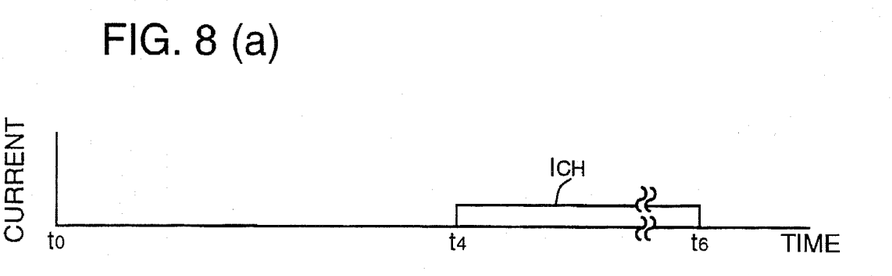
FIG. 8(a) shows a graph of the recharged circuit current when charging is insufficient, according to the first embodiment.
FIG. 8(b) shows a graph of a voice coil motor drive circuit when charging is insufficient, according to the first embodiment.
FIG. 8(c) shows a graph of the signal processing and other circuits when charging is insufficient, according to the first embodiment.

Although the start time period T2 30 shown in FIG. 6 of the spindle motor rotation in this case is about twice the start time period T1 29 of the spindle motor rotation for the case shown in FIG. 3 where the charge of the auxiliary power source is sufficient, the required current ($I_{EX}$) from the external main power source is unchanged and, therefore, it is smaller than the required current ($I_{EX}$) from the external main power source during the seek period. This results from selecting the low speed, low current start control procedure 17b instead of the high speed start control procedure 17a.

Figure 13:
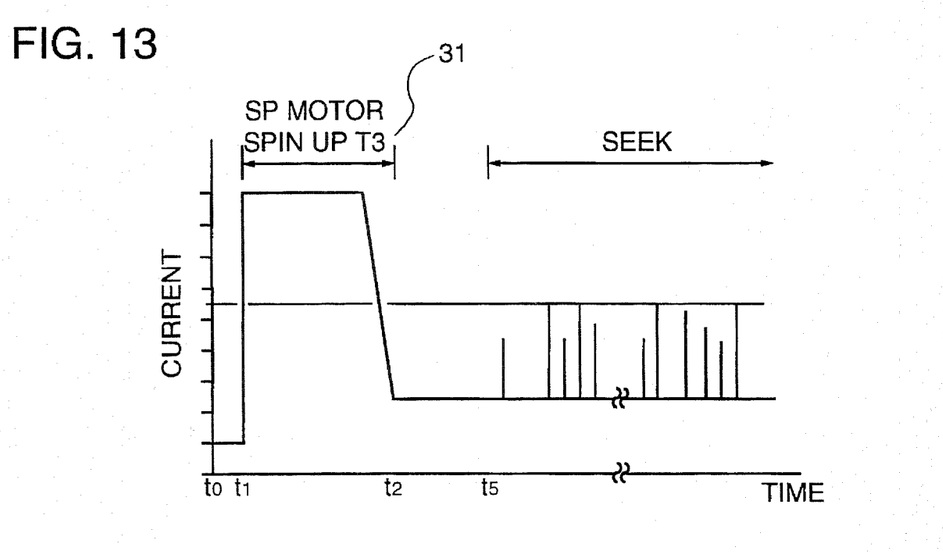
FIG. 13 is a graph showing the current of the external power source when the present invention is not employed.

If the present invention is not used and it is impossible to select the low speed, low current start control procedure 17b, the current ($I_{EX}$) 2a of the external main power source becomes as shown in FIG. 13 and, therefore, the maximum required current ($I_{EX}$) of the external main power source occurs not in the seek period but in the start period T3 31 of the spindle motor rotation. Therefore, a large power source large enough to supply the maximum current shown in this period T3 31 has to be used as the external main power source. Comparing this, since, according to the first embodiment, the current $I_{EX}$ of the external main power source which is required in the start time T1 or T2 does not exceed the maximum current during the seek period and so a small external main power source 1 can be used as shown in FIGS. 3 and 6.

Figure 9:
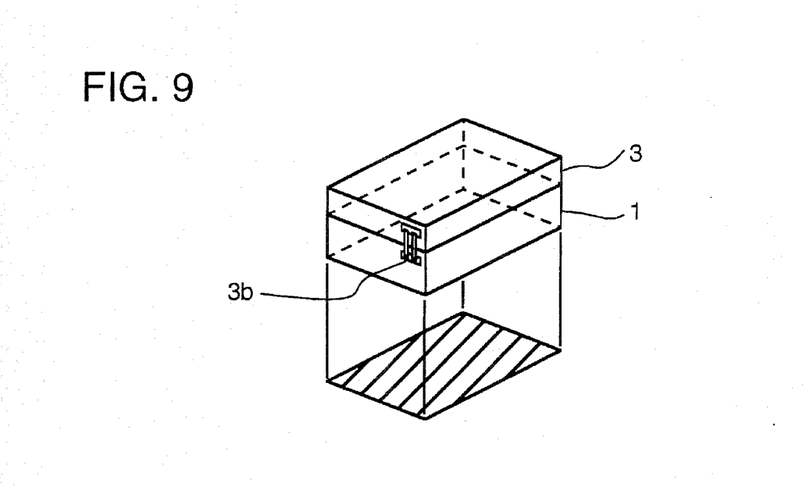
FIG. 9 is a perspective view of a magnetic disk device with an auxiliary power source, according to the present invention.

FIG. 9 is a perspective view of the magnetic disk device according to the first embodiment of the present invention. The aspect ratio of a form factor (standard size) of a projection (shown by a hatching in FIG. 9) of a casing of a hard disk device of any size, for example of a 5.25 inch disk, a 3.5 inch disk, a 2.5 inch disk, a 1.8 inch disk and a 1.3 inch disk. This is the so-called golden section ratio and the aspect ratios for the 3.5 inch disk is obtained by dividing that for the 5.25 inch disk by 2, that for the 2.5 inch disk by dividing that for the 3.5 inch disk by 2, that for the 1.8 inch disk by dividing that for the 2.5 inch disk by 2 and that for the 1.3 inch disk by dividing that for the 2.5 inch disk by 2. The size (mm×mm) of the projection (longitudinal length×lateral length) is 101.6×146 for the 3.5 inch disk, 73×101.6 for the 2.5 inch disk, 50.8×73 for the 1.8 inch disk and 36.5×50.8 for the 1.3 inch disk. The size of the projection (longitudinal length×lateral length) of the casing of the rechargeable external auxiliary power source is made equal to the projection of the casing of the disk device for, for example, the 5.25 (or 3.5) inch disk and the casing of the rechargeable external auxiliary power source and the casing of the disk device are fixed in a stacked arrangement as shown in FIG. 9 by suitable electrical coupling means. With this construction, it is possible to couple up to two disk devices each for the 3.5 inch disk (or 2.5 inch disk), up to 4 disk devices for the 2.5 (or 1.8 inch) disk, up to 8 disk devices for the 1.8 inch (or 1.3 inch) disk and up to 16 disk devices for the 1.3 inch disk for a single external auxiliary power source, respectively, as shown in FIG. 9.

Figure 10:
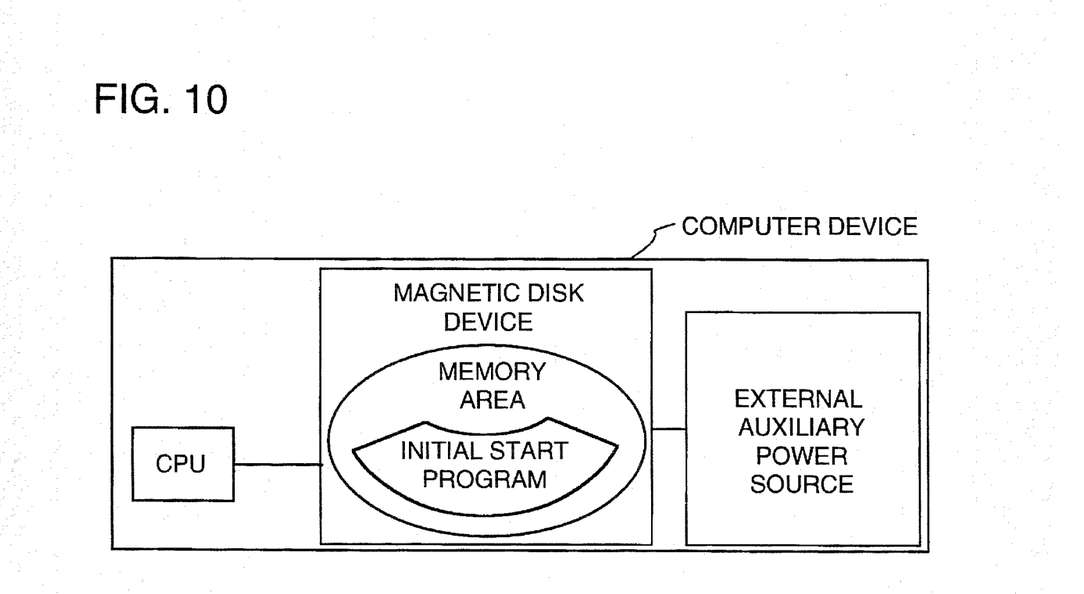
FIG. 10 is a block diagram construction of a computer device with which the disk device of the present invention can be used according to an embodiment of the invention.

FIG. 10 shows a construction of a computer device that uses the disk device according to the first embodiment. An initial start program of the computer device is stored in a memory region on a disk surface of the magnetic disk device and read out from the magnetic disk device to a CPU of the computer device at a start time of the computer device (at this time, the disk device has been started already and brought up to operational speed).

In the embodiment of the invention as shown in FIG. 1, a portion or the whole portion of the rechargeable auxiliary power source 3 may be provided within the magnetic disk device 1, instead of providing the whole portion thereof externally as shown. Further, the recharge circuit 13 and the charge state detection circuit 14 may be provided externally of the magnetic disk device 1, instead of providing it within the device as shown in FIG. 1. Also as shown in FIG. 1, one or more additional magnetic disk devices 1' may be connected to the external main power source and rechargeable auxiliary power source as well as the host computer for the purpose of establishing a redundant array of disks, for example.

Figure 11:
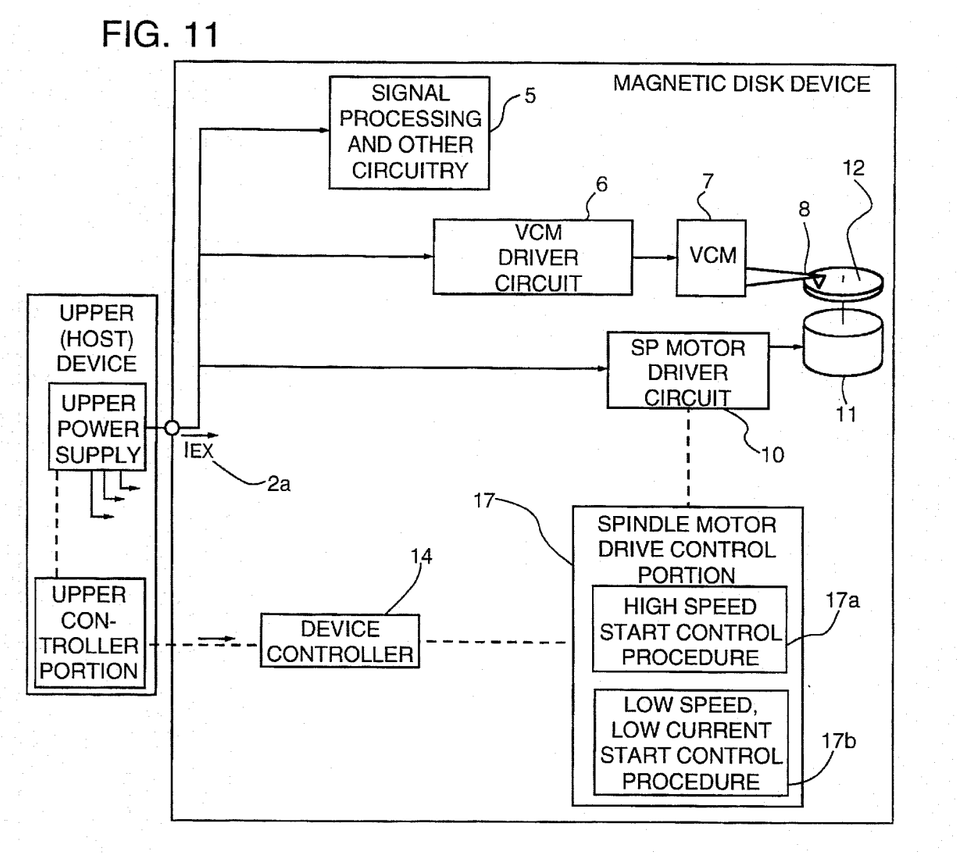
FIG. 11 shows a block diagram construction of a magnetic disk device according to a second embodiment of the present invention.

FIG. 11 shows a construction of a magnetic disk device according to a second embodiment of the present invention. In contrast to the first embodiment shown in FIG. 1, there is no rechargeable auxiliary power source 3, connector 3b, current limiting and reverse current blocking circuit 9, recharge circuit 13, charge state detection circuit 14 and current adder switch 15, which are omitted or removed. The other components which are in common with the FIG. 1 embodiment operate in the manner as discussed with respect to the FIG. 1 embodiment.

Figure 12:
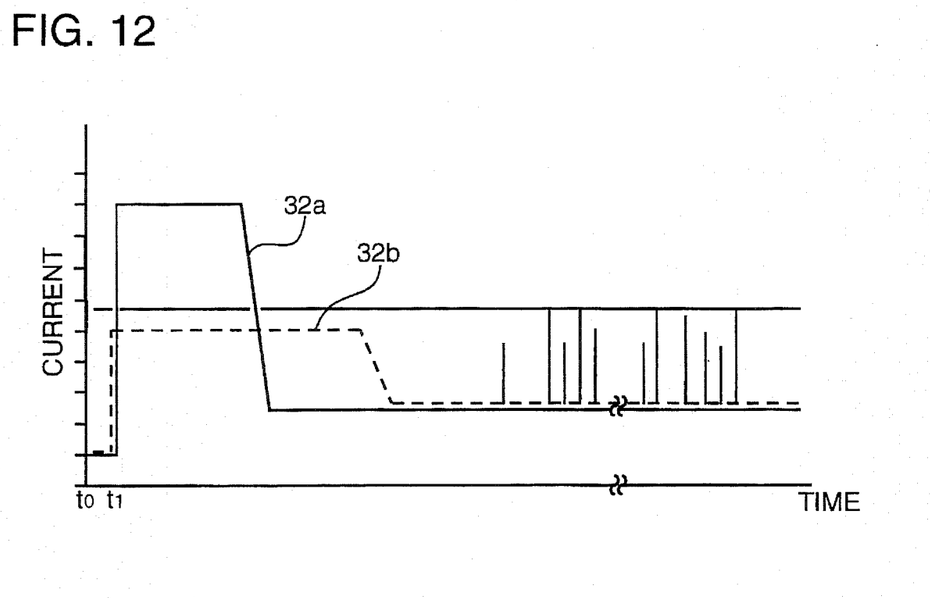
FIG. 12 is a graph showing the current of an external main power source when charging is sufficient, according to a second embodiment of the invention.

FIG. 12 shows the required current of the external power source of the magnetic disk device according to the second embodiment of the present invention. The required current 32a of the external power source is shown when the high speed start control procedure is selected and the required current 32b of the external power source is shown when the low speed, low current start control procedure is selected. According to this embodiment, the low speed, low current start control procedure 32b is selected when an upper host device drives a liquid crystal display and other peripheral devices and consumes a large amount of the power for the upper device, which is provided by the external power source; and the high speed start control procedure 32a is selected when the above and other peripheral devices are inoperative and power consumption is small, so that the capacity of the upper power source can be made small.

Although, in the above mentioned embodiments, about half of the input current $I_{SPM}$ of the spindle drive circuit at the start time is supplemented by the current $I_{EX}$ of the external main power source and the output current $I_{SB}$ of the auxiliary power source, the ratio can be changed and, when the capacity of the auxiliary power source 3 is large, a half of the current $I_{SPM}$ or more can be supplemented by the current $I_{SB}$.

As described in detail hereinabove, according to the present invention, the following effects are obtained.

(1) A current supplied from the external power source is added to a current supplied from the auxiliary power source during a transient period including an initial period of a start up of rotation of the spindle motor and the combined current is supplied to the spindle motor drive circuit. Therefore, it is possible to provide a disk device in which the start time is substantially shortened by the amount of supply current provided by the auxiliary power source for the start operation including the start of the spindle motor without increasing the maximum required power source current. That is, by making the start current supplied to the spindle motor N times, the time required for starting rotation can be made substantially 1/N. Further, it is possible to realize a disk device having a smaller required power source current capacity or a small required power source current capacity during the starting of the disk device without increasing the start time.

(2) It is possible to start a disk device without substantially increasing the required power source current capacity and without fault due to a shortage of power source current capacity, although requiring a longer start time, by executing a start control requiring a smaller current than usual even when the rechargeable auxiliary power source is insufficiently charged due to frequently starting the disk device, for example.

(3) It is also possible to obtain the same effects as those mentioned in the items (1) and (2) without providing a mounting space for a rechargeable auxiliary power source in the disk device. Further, it is possible to start a disk device without substantial increase of the required power source current capacity and without fault due to short of power source current capacity either when an external power source is mounted or when it is separated.

(4) When a user confirms compatibility between a disk device and a current specification of an external power source to be used therefor by means of a drawing design, experiment or test, etc., it is unnecessary to pay special attention to the power source current characteristics during a start time of the device, which have an initial and transient time.

(5) It is further possible to obtain the same effects as those mentioned in the items (1) and (2) without providing a mounting space for a rechargeable auxiliary power source in the disk device. Further, it is possible to start a disk device without substantial increase of the required power source current capacity and without fault due to a shortage of power source current capacity either when an external power source is mounted or when it is separated.

(6) It is still further possible to preliminarily avoid a loss of the effect (1) due to the performance of the rechargeable auxiliary power source being degraded beyond its charge/discharge life, by exchanging the auxiliary power source on the basis of a display of the time at which the auxiliary power source is to be exchanged according to the host device.

(7) The mounting of the disk device on an upper host device is convenient since the form factor size thereof is unchanged regardless of position of the external auxiliary power source with respect to the disk device. In particular, the auxiliary power supply and disk device combination of the invention can be designed to fit together so that their combined dimensions are the same as a standard PC card, which permits interchange versatility with a variety of different sized computers.

(8) It is also possible to reduce a required space for the external auxiliary power source.

(9) An initial start of the computer device is completed within a short time. If necessary, the difference in start times selected in accordance with the considerations set forth above are transmitted to the CPU or host device in order to prevent any conflicts that might result while waiting for a longer start time to elapse, for example.

We claim:

1. A disk device for use with a computer having an external power source, comprising:

at least one disk and head assembly, said disk being driven in rotation by a DC spindle motor, and means for driving said DC spindle motor;

means for electrically connecting the external power source to said disk device including means for providing a first current from said external power source to the spindle motor drive means;

means for connecting the disk device to an auxiliary power source;

means electrically connected with said external power source and said auxiliary power source for recharging said auxiliary power source;

current adding means connected to said spindle motor drive means and receiving a second current from said auxiliary power source for selectively adding said second current to said first current during an initial period of driving said DC spindle motor with said spindle motor drive means to an operational speed of rotation that is required for read and write access of the disk; and means for controlling said current adding means to selectively add said second current to said first current during said initial period and to charge said auxiliary power source with said external power source after said initial period while rotating said DC spindle motor.

2. A disk device according to claim 1, further comprising charge state detection means for detecting the charge state of said auxiliary power source and being connected to said controlling means, said controlling means receiving said charge state as information concerning a predetermined condition and adding said second current from said auxiliary power source to said first current from said external power source when said charge state is at least a predetermined value.

3. A disk device according to claim 1, further comprising drive control means for controlling the driving of said DC spindle motor in one of at least two start control procedures, including a first procedure for driving said motor with a first required current for a first period of time until said disk reaches said operational speed, and a second procedure for driving said motor until said disk reaches said operational speed with a second required current that is less than said first required current for a second period of time that is greater than said first period of time, wherein said controlling means is connected with said drive control means for selecting one of said at least two procedures.

4. A disk device according to claim 3, wherein said controlling means detects a charge state of said auxiliary power source as said predetermined condition and selects said first procedure when said charge state is at least a predetermined value and selects said second procedure when said charge state is less than said predetermined value.

5. A disk device according to claim 1, further comprising means connected to said external power source for driving said head in a seek operation for read/write access of said disk, said head driving means having a seek operation current requirement, wherein a spin up current capacity of said external power source is not larger than said seek operation current requirement.

6. A disk device according to claim 1, further comprising means for indicating that said auxiliary power source needs replacement on a basis of a charging/discharging life of said auxiliary power source.

7. A device for use with a computer having an external power source, comprising:

a disk device having at least one disk and head assembly, said disk being driven in rotation by a spindle motor, and means for driving said spindle motor;

means for electrically connecting the external power source to disk device including means for providing a first current from said external power source to the spindle motor drive means;

an auxiliary power source;

means electrically connected with said external power source and said auxiliary power source for recharging said auxiliary power source;

current adding means connected to said spindle motor drive means and receiving a second current from said auxiliary power source for selectively adding said second current to said first current during an initial period of driving said spindle motor with said spindle motor drive means to an operational speed of rotation that is required for read and write access of the disk; and means for controlling said current adding means to selectively add said second current to said first current during said initial period and to charge said auxiliary power source with said external power source after said initial period while rotating said DC spindle motor.

8. A device according to claim 7, wherein said auxiliary power source is external of said disk device.

9. A disk device according to claim 7, further comprising said disk device having charge state detection means for detecting the charge state of said auxiliary power source and being connected to said controlling means, said controlling means receiving said charge state as information concerning a said predetermined condition and adding said second current from said auxiliary power source to said first current from said external power source when said charge state is at least a predetermined value.

10. A device according to claim 9, wherein said auxiliary power source, said recharging means and said charge state detection means are external of said disk device.

11. A device according to claim 9, wherein said auxiliary power source has a rectangular-parallelepiped casing, wherein two of three outer dimensions of the casing have larger values than that of a remaining outer dimension, and wherein said disk device has a rectangular-parallelepiped casing with two of three outer dimensions that also have larger values than that of a remaining dimension; the casing of the disk device and the casing of the auxiliary power source being assembled together to form said device with a substantially rectangular-parallelepiped shape.

12. A device according to claim 7, further comprising a plurality of said disk devices connected to one said auxiliary power source.

13. A device according to claim 7, wherein said disk has an initial start program storage area for storing an initial start program accessed by said computer when said computer is started.

14. A disk device for use with a computer having an external power source, comprising:

at least one disk and head assembly, said disk being driven in rotation by a DC spindle motor, and motor driving means for driving said DC spindle motor;

motor-driving control means for controlling said motor driving means by selecting starting procedures, the procedures deciding an electric power amount used during an initial period of said motor driving means from a motionless mode to an operational speed of rotation that is required for read and write access of the disk; and monitoring means for monitoring said external power to determine a power margin of said external power source and outputting a signal dependent on said power margin to said motor-driving control means.

15. A method of controlling the starting of driving of a disk device for use with a computer having an external power source and an auxiliary power source, said disk device having at least one disk and head assembly, said disk being driven in rotation by a DC spindle motor, comprising the steps of:

driving a start of the DC spindle motor in one of at least two start control procedures, including a first procedure for driving said motor with a first required current for a first period of time until said disk reaches an operational speed for read/write access with said head, and a second procedure for driving said motor until said disk reaches said operational speed with a second required current that is less than said first required current for a second period of time that is greater than said first period of time; charging said auxiliary power source with said external power source after one of said first and second periods of time has elapsed in a corresponding one of said start control procedures while rotating said DC spindle motor; and selecting one of the two procedures in accordance with a predetermined condition.

16. A method according to claim 15, further comprising driving said head in a seek operation for read/write access of said disk, said head driving having a seek operation current requirement, wherein a spin up current capacity of said external power source is not larger than said seek operation current requirement.

* * * * *